(12) United States Patent
Kumar

(10) Patent No.: US 9,296,300 B2
(45) Date of Patent: Mar. 29, 2016

(54) METHOD AND SYSTEM FOR POWERING A VEHICLE

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 837 days.

(21) Appl. No.: 13/572,977

(22) Filed: Aug. 13, 2012

(65) Prior Publication Data

US 2013/0270897 A1  Oct. 17, 2013

Related U.S. Application Data

(60) Provisional application No. 61/624,077, filed on Apr. 13, 2012.

(51) Int. Cl.
*B60L 3/00* (2006.01)
*B60L 1/00* (2006.01)
(Continued)

(52) U.S. Cl.
CPC ............... *B60L 1/003* (2013.01); *B60L 3/003* (2013.01); *B60L 3/0061* (2013.01); *B60L 11/02* (2013.01); *B60L 11/123* (2013.01); *B60L 11/1887* (2013.01); *B60L 2200/10* (2013.01); *B60L 2200/26* (2013.01); *B60L 2200/32* (2013.01);
(Continued)

(58) Field of Classification Search
CPC ...... B60L 1/003; B60L 3/003; B60L 2200/26
USPC ............... 307/9.1; 191/22 R; 105/35
See application file for complete search history.

(56) References Cited

U.S. PATENT DOCUMENTS 5,334,878 A * 8/1994 Vanek ................ B60L 1/00
                                                     191/4
5,689,178 A * 11/1997 Otake ................ 323/282
(Continued)

FOREIGN PATENT DOCUMENTS

CN   102673424 A   9/2012
EP    2255990 A1  12/2010
(Continued)

OTHER PUBLICATIONS

International Search Report and Written Opinion issued in connection with corresponding PCT Application No. PCT/US2013/033640 on Dec. 10, 2013.
(Continued)

*Primary Examiner* — Jared Fureman
*Assistant Examiner* — Alfonso Perez Borroto
(74) *Attorney, Agent, or Firm* — GE Global Patent Operation

(57) ABSTRACT

A system for powering a vehicle includes a traction bus, an auxiliary bus, chopper devices, and a control unit. The traction bus is coupled with traction motors of the vehicle to supply a first voltage to power the traction motors. The auxiliary bus is coupled with non-traction motors of the vehicle to supply a different, second voltage to the non-traction motors to. The chopper devices are conductively coupled with both the traction bus and the auxiliary bus to control conduction of the first voltage on the traction bus to the auxiliary bus as the second voltage using first and second duty cycles. The control unit is coupled with the chopper devices to control the first and second duty cycles of the chopper devices, respectively, such that the first voltage on the traction bus is changed (e.g., reduced) to the second voltage on the auxiliary bus.

24 Claims, 5 Drawing Sheets

(51) Int. Cl.
*B60L 11/02* (2006.01)
*B60L 11/12* (2006.01)
*B60L 11/18* (2006.01)

(52) U.S. Cl.
CPC .......... *B60L 2200/40* (2013.01); *B60L 2210/10* (2013.01); *B60L 2210/30* (2013.01); *B60L 2210/40* (2013.01); *B60L 2240/36* (2013.01); *B60L 2260/28* (2013.01); *Y02T 10/6217* (2013.01); *Y02T 10/7077* (2013.01); *Y02T 10/7216* (2013.01); *Y02T 10/7241* (2013.01); *Y02T 90/34* (2013.01)

(56) References Cited

U.S. PATENT DOCUMENTS

| | | | |
|---|---|---|---|
| 6,294,886 B1 | 9/2001 | Gibard | |
| 6,486,568 B1 | 11/2002 | King | |
| 7,256,513 B2 | 8/2007 | Kumar | |
| 7,928,597 B2 | 4/2011 | Gupta | |
| 2005/0276020 A1* | 12/2005 | Ahmad | 361/698 |
| 2008/0290825 A1* | 11/2008 | St-Jacques | B60L 7/12 318/380 |
| 2010/0108419 A1 | 5/2010 | Curbelo et al. | |
| 2011/0166736 A1* | 7/2011 | Kitanaka | B60L 3/003 701/22 |
| 2011/0260528 A1 | 10/2011 | Obayashi et al. | |
| 2011/0315043 A1 | 12/2011 | Kumar | |
| 2012/0049812 A1 | 3/2012 | Pinon et al. | |
| 2013/0076135 A1* | 3/2013 | Zhu et al. | 307/43 |

FOREIGN PATENT DOCUMENTS

| | | |
|---|---|---|
| JP | 1084601 A | 3/1998 |
| JP | 2000078702 A | 3/2000 |
| JP | 2001136735 A | 5/2001 |
| JP | 2006340561 A | 12/2006 |
| JP | 2007228660 A | 9/2007 |

OTHER PUBLICATIONS

Unofficial English translation of Office Action issued in connection with corresponding JP Application No. 2015-504614 on Jun. 23, 2015.

Unofficial English translation of Chinese Office Action issued in connection with corresponding CN Application No. 201380019778.0 on Nov. 4, 2015.

* cited by examiner

METHOD AND SYSTEM FOR POWERING A VEHICLE

CROSS-REFERENCE TO RELATED APPLICATIONS

This application claims priority to U.S. Provisional Application No. 61/624,077, which was filed on 13 Apr. 2012. The entire disclosure of U.S. Provisional Application No. 61/624,077 is incorporated by reference.

BACKGROUND

Some known vehicles include traction motors that provide tractive effort to propel the vehicles and non-traction motors that provide non-tractive work for the vehicles. The non-traction motors can operate on compressors, rotate fans or blowers to cool the traction motors, radiators, brakes, and the like, or perform other functions. In some known vehicles, such as locomotives, the traction motors operate at relatively high voltages, such as 1400 volts, to provide sufficient tractive effort to propel the vehicles.

A single power source may provide the electric current to power the traction and non-traction motors. For example, an engine may rotate a shaft connected to an alternator or generator to create electric current to power the motors. Conductors, such as busses, can convey the created current to the traction and non-traction motors to power the motors. Because the traction motors in some vehicles may require relatively large voltages (e.g., 1400 volts), the non-traction motors may need to be able to handle these large voltages. For example, high voltage motors may need to be used for the non-traction motors. Such high voltage motors may include non-randomly wound conductive coils to be able to operate on the high voltages. These motors, however, can be relatively expensive and can significantly add to the cost and/or maintenance needs of the vehicle.

Alternatively, the voltages from the power source may need to be modified before reaching the non-traction motors. For example, filters may be connected with the high voltage motors to eliminate or reduce transient voltages from being conveyed to the motors and possibly damaging the motors. Additionally or alternatively, transformers may be necessary to reduce the voltages from the power source to smaller, more acceptable voltages for the non-traction motors.

The adding such components (e.g., filters and/or transformers) can significantly increase the cost, maintenance needs, and weight of the vehicle. With respect to weight, the addition of transformers to a vehicle may add hundreds of pounds or kilograms to the weight of the vehicle. Such an addition of weight may not be possible for some vehicles (e.g., automobiles), and may be undesirable for other vehicles. For example, with respect to locomotives, adding transformers to the locomotives increases the weight of the locomotive, which can require additional tractive effort and fuel to propel the locomotive. Additionally, the transformers can consume additional volume in the limited space of a locomotive.

BRIEF DESCRIPTION

In one embodiment, a system (e.g., for powering a vehicle) includes a traction bus, an auxiliary bus, first and second chopper devices, and a control unit. The fraction bus is conductively coupled with one or more traction motors of a vehicle. The traction bus is configured to supply a first voltage to power the one or more traction motors in order to propel the vehicle. The auxiliary bus is conductively coupled with one or more non-traction motors of the vehicle and is configured to supply a different, second voltage to power the one or more non-traction motors to perform non-tractive work of the vehicle. The first and second chopper devices are conductively coupled with both the traction bus and the auxiliary bus. The first and second chopper devices are configured to control conduction of the first voltage on the traction bus to the auxiliary bus as the second voltage using first and second duty cycles, respectively. By controlling conduction, it is meant that the first and second chopper devices can control when the voltages are conveyed on, through, or by the fraction bus to the auxiliary bus. The control unit is operatively coupled with the first and second chopper devices to control the first and second duty cycles of the first and second chopper devices, respectively, such that the first voltage on the traction bus is changed to the second voltage on the auxiliary bus.

In another embodiment, another system (e.g., for powering a vehicle) includes a traction bus, an auxiliary bus, first and second chopper devices, and a control unit. The traction bus is conductively coupled with one or more traction motors of a vehicle and is configured to supply a first voltage to power the one or more traction motors in order to propel the vehicle. The auxiliary bus is conductively coupled with one or more non-traction motors of the vehicle and is configured to supply a different, second voltage to power the one or more non-traction motors to perform non-tractive work of the vehicle. The first and second chopper devices are conductively coupled with both the traction bus and the auxiliary bus and are configured to control conduction of the first voltage on the traction bus to the auxiliary bus as the second voltage using first and second duty cycles, respectively. The control unit is operatively coupled with the first and second chopper devices to independently control the first and second duty cycles of the first and second chopper devices, respectively, such that the first and second duty cycles occur over different time periods in order to change the first voltage on the traction bus to the second voltage on the auxiliary bus.

In another embodiment, a method (e.g., for powering a vehicle) includes conveying a first voltage along a traction bus of a vehicle that is conductively coupled with one or more traction motors of the vehicle. The first voltage powers the one or more traction motors in order to propel the vehicle. The method also includes controlling first and second chopper devices that are conductively coupled with the traction bus and an auxiliary bus of the vehicle over different first and second duty cycles, respectively, such that the first and second chopper devices convert the first voltage to a second voltage on the auxiliary bus. The method further includes conveying the second voltage along the auxiliary bus to one or more non-traction motors of the vehicle in order to power the one or more non-traction motors to perform non-tractive work of the vehicle. The first and second duty cycles of the first and second chopper devices differ from each other such that the first voltage is reduced to the second voltage to power the non-traction motors without conveying the first voltage that is received by the first and second choppers through one or more of a filter or transformer to reduce the first voltage or a transient voltage of the first voltage prior to the second voltage being received by the non-traction motors.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that convert relatively high voltages conveyed along a traction bus (e.g., for powering traction motors of a vehicle) to smaller voltages for transmission along an auxiliary bus in order to power non-traction motors, such as motors that operate on smaller voltages to perform work that does not involve propelling the vehicle. For example, voltages of 1400 volts (or another high voltage) can be transferred from one bus to another bus, where the transferred voltage is reduced to 700 volts (or another low voltage) for powering the non-traction motors. The high voltages on the traction bus can be reduced to smaller voltages on the auxiliary bus without conveying the high voltages through filters, transformers, and the like, and/or without modifying the non-traction motors to accept the high voltages. For example, standard (e.g., non-modified after purchase or installation) motors having random conductive windings (e.g., 480 volt motors) can be used as the non-traction motors of a locomotive (or other vehicle) and powered by a voltage that is reduced from the high voltages provided to the traction motors of the locomotive. The standard motors can be used without changing the windings in the motors and/or without passing the high voltages supplied to the traction motors through a transformer (e.g., to reduce the voltage) and/or filter (e.g., to remove transient voltages) prior to powering the standard motors.

Figure 1:
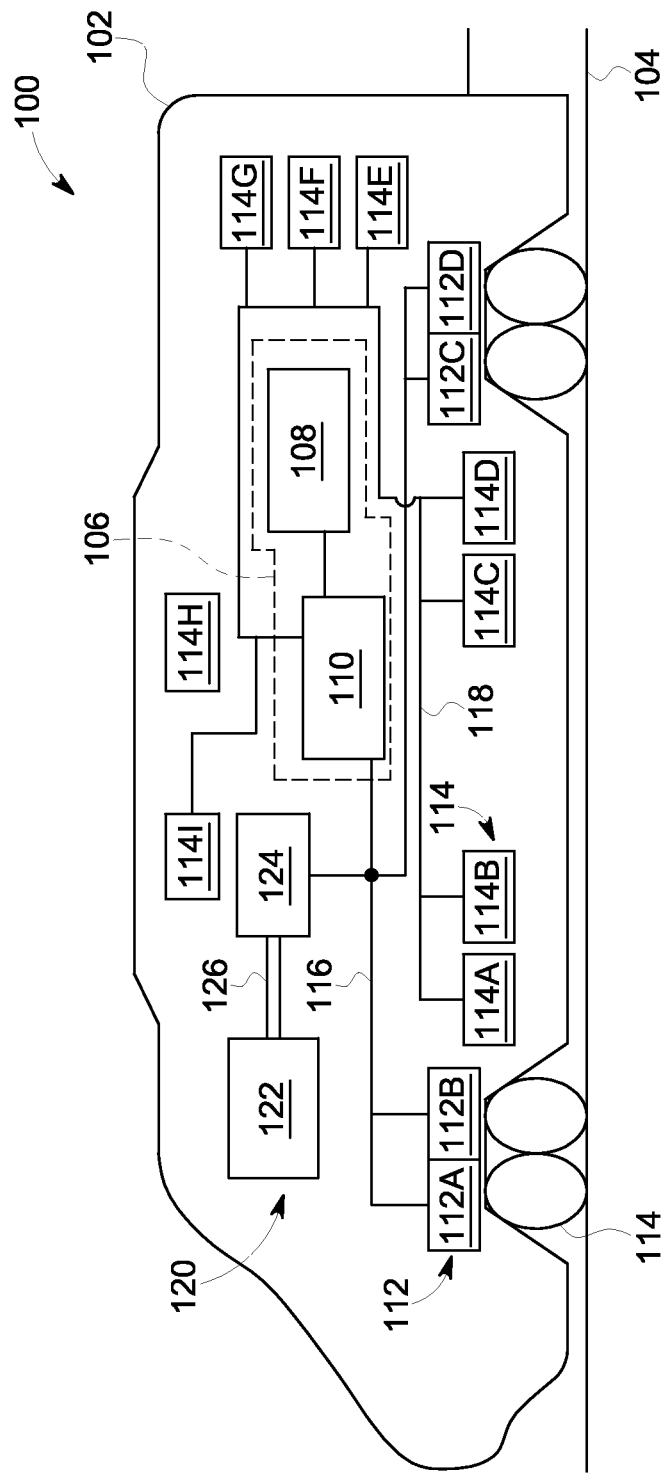
FIG. 1 is a schematic view of one embodiment of a vehicle system.

FIG. 1 is a schematic view of one embodiment of a vehicle system 100. The system 100 includes a vehicle 102 that travels along a surface 104. In the illustrated embodiment, the vehicle is a powered rail vehicle, such as a locomotive. Alternatively, the vehicle 102 may represent another rail vehicle, such as a consist of locomotives, a train comprising one or more locomotives and one or more non-powered (e.g., incapable of self-propulsion) rail cars, and the like. In another embodiment, the vehicle 102 may represent another type of powered vehicle that is capable of self propulsion, such as an automobile, an off-highway vehicle other than a rail vehicle, a marine vessel, an airplane, and the like. The surface 104 may represent a track, a road, a body of water, air (e.g., over which an airplane flies), and the like, over which the vehicle 102 travels.

The vehicle 102 includes a propulsion power system and an auxiliary power system disposed onboard the vehicle 102. The propulsion power system includes several components that convey and/or receive electric energy (e.g., electric current) to power one or more tractive loads for propelling the vehicle 102 along the surface 104. The auxiliary power system includes several components that convey and/or receive electric energy to power one or more non-tractive loads, or loads that perform non-traction work that does not propel the vehicle 102 along the surface 104. A conversion system 106 is disposed onboard the vehicle 102 to convert at least some of the electric current conveyed in the propulsion power system to the auxiliary power system, as described below.

The conversion system 106 includes a control unit 108 and chopper devices 110 that convert the current in the propulsion power system to a different current for the auxiliary power system. The chopper device 110 shown in FIG. 1 may represent several chopper devices. The control unit 108 may be embodied in a computer, computer processor, microcontroller, microprocessor, or other logic-based device, that operates based on one or more sets of instructions (e.g., software) stored on a tangible and non-transitory computer readable storage medium (e.g., hard drive, flash drive, ROM, or RAM). The control unit 108 may represent the hardware (e.g., circuitry, memory, and the like) and/or the instructions (e.g., software) on which the hardware operates. The chopper devices 110 include electronic circuits that are controlled by the control unit 108 to switch between open and closed states. In the open state, a chopper device 110 does not conduct electric current from the propulsion power system to the auxiliary power system. In the closed state, a chopper device 110 does conduct the electric current from the propulsion power system to the auxiliary power system. As described below, the control unit 108 can independently control when each of the chopper devices 110 is in the open state or closed state in order to change (e.g., reduce) the voltage that is conveyed along the propulsion power system for supplying the changed (e.g., reduced) voltage in the auxiliary power system.

The propulsion power system includes components that are powered by electric current (e.g., direct current) to propel the vehicle 102. The propulsion power system can include several traction motors 112 (e.g., motors 112A-D) that are joined to wheels 114 or axles of the vehicle 102. The traction motors 112 are powered by voltage conveyed along a conductive traction bus 116 of the propulsion power system in order to rotate the axles and/or wheels 114 of the vehicle 102 in order to propel the vehicle 102.

The auxiliary power system includes components that are powered by electric current to perform non-tractive work (e.g., functions or work that does not propel the vehicle 102) of the vehicle 102. In one embodiment, these components include non-traction motors 114 (e.g., motors 114A-I) that are joined to one or more other devices or components, such as fans, compressors, and the like. For example, the non-traction motors 114A, 114D may represent the motors and traction motor blowers, such as fans, that are rotated by the non-traction motors to blow air over the traction motors 112A-D to cool the traction motors 112A-D. The non-traction motors 114B, 114C may represent motors and radiator fans that are rotated by the motors 114B, 114C to cool one or more components of the vehicle 102. The non-traction motors 114E-I can represent the non-traction motors and/or one or more other components, such as compressors, other fans, or other electric loads. Alternatively, other electric loads may be joined with the non-traction motors 114. The non-traction motors 114 are powered by voltage that is conveyed along a conductive auxiliary bus 118 of the auxiliary power system.

A power source 120 provides electric current to the propulsion and auxiliary power systems. The power source 120 in the illustrated embodiment represents a prime mover 122 (such as an engine) joined to an alternator 124 (or generator) by a shaft 126. The prime mover 122 consumes fuel to rotate the shaft 126, which causes the alternator 124 to generate electric current (e.g., direct current or voltage). This voltage is conveyed along the traction bus 116 to power the traction motors 112. At least some of the voltage is received by and modified by the conversion system 106. For example, the voltage conveyed along the traction bus 116 may be a high voltage that is reduced to a low voltage by the conversion system 106 for transmission along the auxiliary bus 118. In another embodiment, the power source 120 may be an onboard energy storage device, such as one or more fuel cells, capacitors, batteries, and the like, that can store sufficient electric energy to propel the vehicle 102. Alternatively, the power source 120 may be another device or system that can generate electric current onboard the vehicle 102. In another embodiment, the power source 120 may represent a device or system that acquires electric current from an off-board source, such as a pantograph that receives electric current from an electrified catenary, a conductive shoe that engages an electrified rail, and the like.

As used herein, the term "high voltage" may represent a voltage that is greater than can be used to power a 480 volt motor without modifying the conductive windings of the motor and/or conveying the voltage through a filter and/or transformer prior to supplying the voltage to the motor. As one example, "high voltage" may indicate a voltage that is greater than 700 volts. Alternatively, "high voltage" may indicate a voltage that is at least 1400 volts. In another embodiment, "high voltage" may indicate a voltage that is at least 2800 volts. Alternatively, other voltages may be a "high voltage."

Also as used herein, the term "low voltage" may represent a voltage that can be used to power a 480 volt motor without modifying the conductive windings of the motor and/or conveying the voltage through a filter and/or transformer prior to supplying the voltage to the motor. As one example, "low voltage" may indicate a voltage that is no greater than 700 volts, such as 480 volts, 600-700 volts, and the like. Alternatively, other voltages may be a "low voltage."

Figure 2:
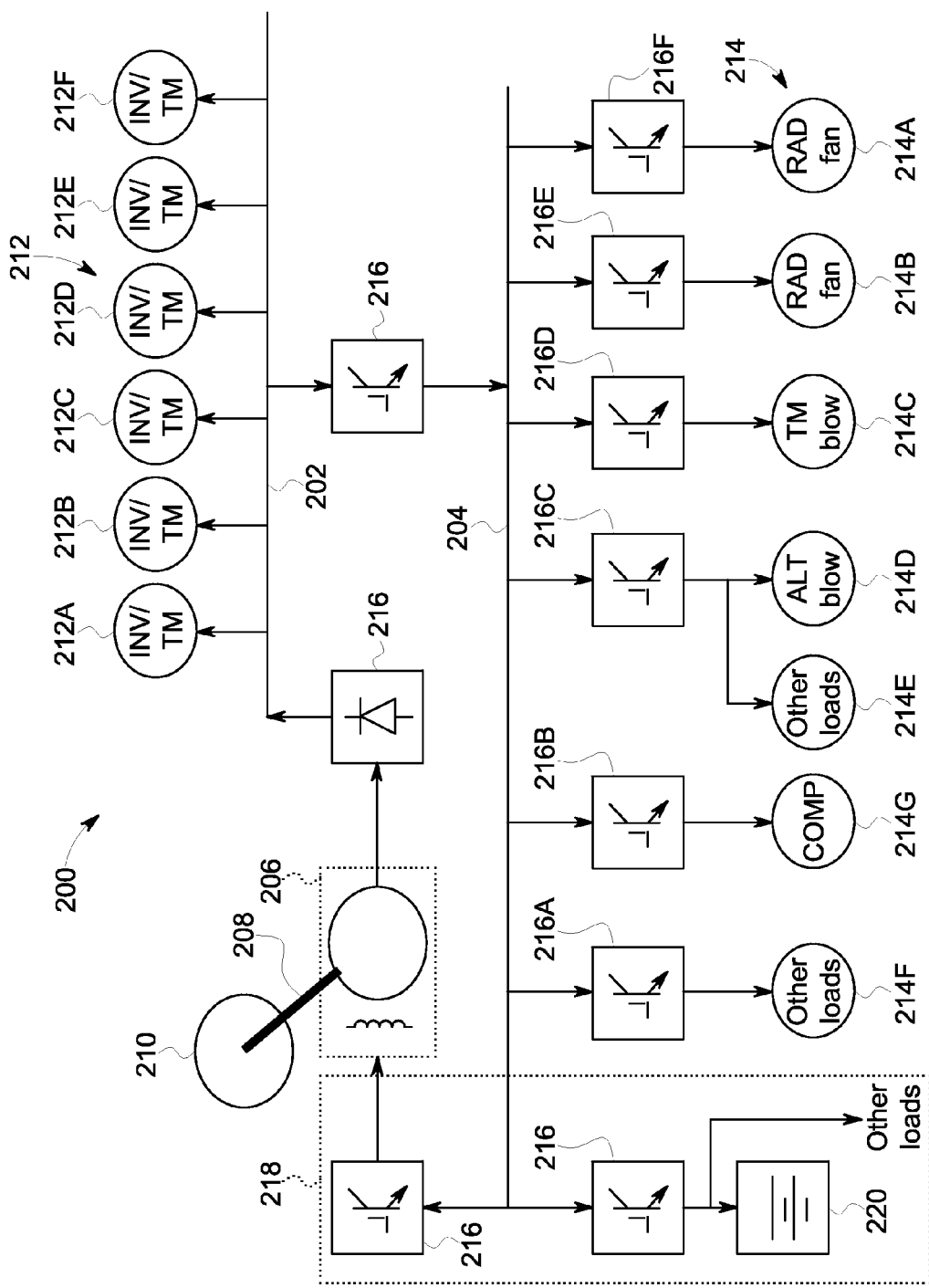
FIG. 2 is a circuit diagram of one example of a power system for a vehicle.

FIG. 2 is a circuit diagram of one example of a power system 200 for a vehicle. The power system 200 may be used to power both traction loads 212 (e.g., traction motors) and non-traction loads 214 (e.g., non-traction motors) of the vehicle. The power system 200 includes a traction bus 202 and an auxiliary bus 204. The traction bus 202 is conductively coupled with an alternator 206 that generates high voltage for transmission along the traction bus 202 based on rotation of a shaft 208 by an engine 210 of the vehicle. The traction loads 212, such as inverters and/or traction motors 212A-F ("INV/TM" in FIG. 2), are powered by the high voltage transmitted along the traction bus 202. A rectifier device 216 ("Rectifier" in FIG. 2) may receive alternating current that is generated by the alternator 206 and convert the alternating current into the high voltage that is conveyed along the traction bus 202.

The auxiliary bus 204 may be interconnected with the traction bus 202 by a converter device 216. The converter device 216 may convert the high voltage on the traction bus 202 to a smaller voltage (e.g., a low voltage) for the auxiliary bus 204. Alternatively, the auxiliary bus 204 may be directly coupled with the fraction bus 202 without the converter device 216. An alternator exciter device 218 that includes one or more converter devices 216, energy storage devices 220 ("Battery" in FIG. 2), and/or other loads may be joined with the auxiliary bus 204.

The non-traction loads 214 are connected to the auxiliary bus 204 by additional converter devices 216 (e.g., converter devices 216A-F). The non-traction loads 214 include radiator fans 214A, 214B ("RAD FAN" in FIG. 2), a traction motor blower 214C ("TM BLOW" in FIG. 2), an alternator blower 214D ("ALT BLOW" in FIG. 2), other electric loads 214E, 214F ("OTHER LOADS" in FIG. 2), and a compressor 214G ("COMP" in FIG. 2). The non-traction loads 214 can represent motors (e.g., non-traction motors) that are powered by a low voltage on the auxiliary bus 204 to perform work that does not propel the vehicle. For example, the non-traction loads 214 can represent 480 volt motors that actuate radiator fans, traction motor blowers, alternator blowers, compressors, and the like.

In order to decrease the high voltage on the traction bus 202 to a voltage on the auxiliary bus 204 that can be accepted by the non-traction loads 214, the converter devices 216 may need to be provided in order to reduce the voltage. The converter devices 216 can include transformers to step down (e.g., reduce) the high voltage on the traction bus 202 to a low voltage, filters to remove transient voltages (e.g., spikes or increases in voltage over a relatively short time period), and the like. But, such converter devices 216, transformers, and filters can be relatively expensive and/or take up considerable space in the limited available volume of a vehicle, such as a locomotive. Additionally or alternatively, non-standard motors, such as motors having non-randomly wound conductive coils, motors other than standard 480 volt motors, and the like, may need to be used as the motors 214 in order to allow the motors 214 to be powered by the voltage delivered from the fraction bus 202. Such motors 214 may be expensive and/or require increased maintenance relative to standard motors, such as standard 480 volt motors.

Figure 3:
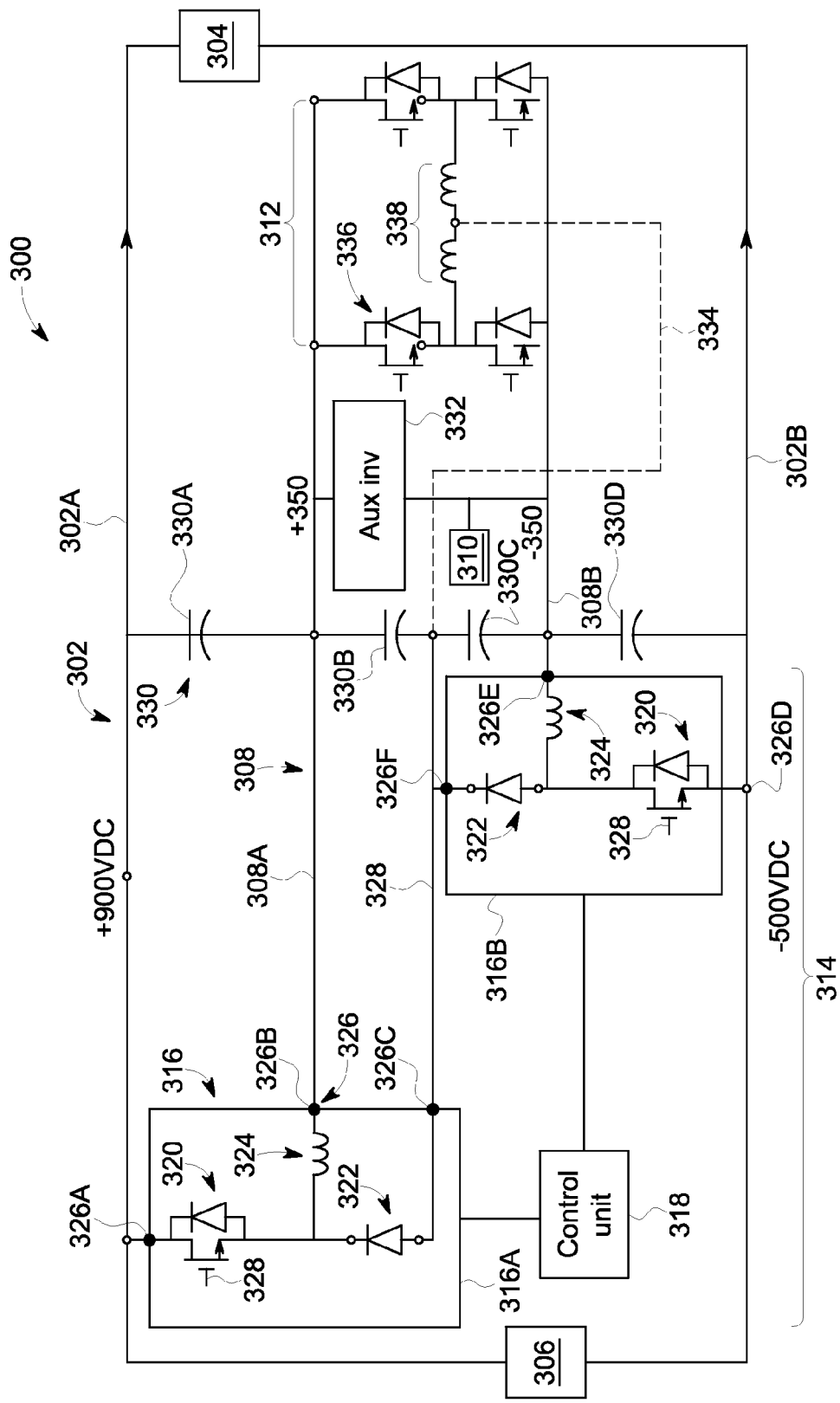
FIG. 3 is a circuit diagram of a power system for the vehicle shown in FIG. 1 in accordance with one embodiment of the inventive subject matter described herein.

FIG. 3 is a circuit diagram of a power system 300 for the vehicle 102 shown in FIG. 1 in accordance with one embodiment of the inventive subject matter described herein. The power system 300 may be used in place of the power system 200 shown in FIG. 2 to provide electric power to both traction loads (e.g., traction motors that propel the vehicle 102) and non-traction, or auxiliary, loads (e.g., electric loads or motors that do not propel the vehicle 102). As described below, the power system 300 can supply voltage to power both the traction loads and the non-traction loads without conveying the voltage through a filter or transformer to remove transient voltages and/or to reduce the voltage to the non-traction loads. As a result, standard motors, such as motors having random conductive windings such as 480 volt motors, can be used as the non-traction loads in one embodiment.

The power system 300 includes a traction bus 302 that is conductively coupled with one or more fraction loads, such as one or more traction motors 304, of the vehicle 102. Although only a single fraction motor 304 is shown in FIG. 3, a greater number of traction motors 304 may be coupled with the traction bus 302. The traction motor 304 may represent one or more, or all, of the traction motors 112 (shown in FIG. 1) of the vehicle 102.

In the illustrated embodiment, the traction bus 302 includes a positive fraction portion 302A and a negative traction portion 302B that represent conductive parts of the fraction bus 302 that convey different portions of a current that is provided by a power source 306. For example, the power source 306 may represent the alternator 124 (shown in FIG. 1) or other power source that provides alternating current or direct current to the traction bus 302. If the power source 306 generates an alternating current, then the power source 306 also may represent a rectifier or other device that converts the alternating current into a direct current. The positive traction portion 302A of the traction bus 302 can convey the positive voltages of the direct current to the traction motors 304 while the negative traction portion 302B conveys the negative voltages of the direct current to the traction motors 304 or to a ground reference (e.g., the electric ground or a chassis of the vehicle 102).

In the illustrated embodiment, the power source 306 provides a direct current of 1400 volts to the traction bus 302, with +900 volts ("+900VDC" in FIG. 3) conveyed along the positive traction portion 302A and −500 volts ("−500VDC" in FIG. 3) conveyed along the negative traction portion 302B. Alternatively, the power source 306 may provide a different voltage and/or a different voltage to one or more of the positive traction portion 302A and/or the negative traction portion 302B.

The power system 300 also includes an auxiliary bus 308 that is conductively coupled with one or more non-traction loads, such as one or more non-traction motors 310 and/or a charger 312 of an energy storage device (e.g., battery) of the vehicle 102. In one embodiment, the non-traction motors 310 represent one or more, or all, of the non-traction motors 114 of the vehicle 102 shown in FIG. 1. The energy storage device that is charged by the charger 312 may be used in place of, or in addition to, the power source 306 to provide power to the non-traction motors 310.

In the illustrated embodiment, the auxiliary bus 308 includes a positive auxiliary portion 308A and a negative auxiliary portion 308B that represent conductive parts of the auxiliary bus 308 that convey different portions of a current that is transferred from the traction bus 302 to the auxiliary bus 308 by a conversion system 314. For example, the traction bus 302 can convey a first voltage, such as a high voltage, to the conversion system 314. The conversion system 314 modifies this voltage to supply a reduced, second voltage, such as a low voltage, to the auxiliary bus 308, as described below. The conversion system 314 may reduce the voltage from the traction bus 302 to the voltage supplied to the auxiliary bus 308 without transmitting the voltage through a filter and/or transformer to remove transient voltages or step down the voltage in one embodiment.

The positive auxiliary portion 308A of the auxiliary bus 308 can convey positive voltages of the direct current on the auxiliary bus 308 to the non-traction motors 310 and/or the charger 312 while the negative auxiliary portion 308B conveys the negative voltages of the direct current on the auxiliary bus 308 to the non-traction motors 310 and/or charger 312, or to a ground reference (e.g., the electric ground or a chassis of the vehicle 102). In the illustrated embodiment, the conversion system 314 provides a direct current of 700 volts to the auxiliary bus 308, with +350 volts ("+350" in FIG. 3) conveyed along the positive auxiliary portion 308A and −350 volts ("−350" in FIG. 3) conveyed along the negative auxiliary portion 308B. Alternatively, the conversion system 314 may provide a different voltage and/or a different voltage to one or more of the positive auxiliary portion 308A and/or the negative traction portion 308B.

The conversion system 314 may represent the conversion system 106 of the vehicle 102 as shown in FIG. 1. In the illustrated embodiment, the conversion system 314 includes chopper devices 316 (e.g., chopper devices 316A, 316B) operatively connected with a control unit 318. The chopper devices 316 may represent the chopper devices 110 shown in FIG. 1 and the control unit 318 can represent the control unit 108 shown in FIG. 1. As used herein, "operably connected" and "operatively connected" indicates that one or more connections (wireless and/or wired) exist between two or more components that allow the components to communicate with each other, to allow one component to control another component, and/or to allow each component to control the other component.

The chopper devices 316 are conductively coupled with both the traction bus 302 and the auxiliary bus 308. In the illustrated embodiment, each of the chopper devices 316 includes a transistor device 320, a diode 322, and an inductor 324 coupled with each other. Alternatively, additional transistors 320, diodes 322, inductors 324 and/or other components may be included in the chopper devices 316. In one embodiment, the chopper devices 316 do not include any filters, such as a capacitor, and/or transformers (e.g., devices that transfer electric energy between different circuits using inductively coupled conductors). The transistors 320 may include or represent insulated gate bipolar junction transistors. Alternatively, the transistors 320 may include or represent other transistors.

The chopper devices 316 include terminals 326 that conductively couple the chopper devices 316 with the traction bus 302 and the auxiliary bus 308. With respect to the chopper device 316A, an input terminal 326A conductively couples the transistor device 320 of the chopper device 316A with the positive traction portion 302A of the traction bus 302, a first output terminal 326B conductively couples the inductor 324 of the chopper device 316A with the positive auxiliary portion 308A of the auxiliary bus 308, and a second output terminal 326C conductively couples the diode 322 of the chopper device 316A with a conductive center bus 328 of the vehicle 102. With respect to the chopper device 316B, an input terminal 326D conductively couples the transistor device 320 of the chopper device 316B with the negative traction portion 302B of the traction bus 302, a first output terminal 326E conductively couples the inductor 324 of the chopper device 316B with the negative auxiliary portion 308B of the auxiliary bus 308, and a second output terminal 326F conductively couples the diode 322 of the chopper device 316B with the center bus 328.

In operation, the chopper devices 316 operate to alternate between a blocking or open state and a conducting or closed state to prevent or allow conduction of the voltage on the traction bus 302 to the auxiliary bus 308, respectively. For example, the transistors 320 of the chopper devices 316 may switch between open and closed states to prevent or allow, respectively, current to be conducted (e.g., flow) through the chopper devices 316 from the traction bus 302 to the auxiliary bus 308. The control unit 318 can control when the transistors 320 are open or closed to control when the copper devices 316 prevent or allow current to be conveyed through the chopper devices 316. For example, the control unit 318 can transmit a control signal that applies a voltage to a gate 328 of the transistors 320 to switch the transistors 320 to a conducting state in order to turn the choppers 316 to the conducting or closed state. The control unit 318 can stop transmitting this control signal or remove the voltage from the gate in order to switch the transistors 320 to a blocking state in order to turn the choppers to the blocking or open state.

The chopper devices 316 may alternate between the blocking and conducting states according to duty cycles. A duty cycle of a chopper device 316 represents when the chopper device 316 is in the blocking state and when the chopper device 316 is in the conducting state, as described below. The control unit 318 can independently control the duty cycles of the chopper devices 316 in order to control the change in voltage from the traction bus 302 to the voltage supplied to the auxiliary bus 308. By "independently control," it is meant that the control unit 318 can change the duty cycle of one chopper device 316A or 316B and not change the duty cycle of another chopper device 316B or 316A. For example, the duty cycles of the chopper devices 316 may not be based on, or dependent on, each other. Instead, the control unit 318 can vary the duty cycles in order to achieve a designated (e.g., automatically controlled) or desired (e.g., operator input) voltage drop between the traction bus 302 and the auxiliary bus 308.

Figure 4:
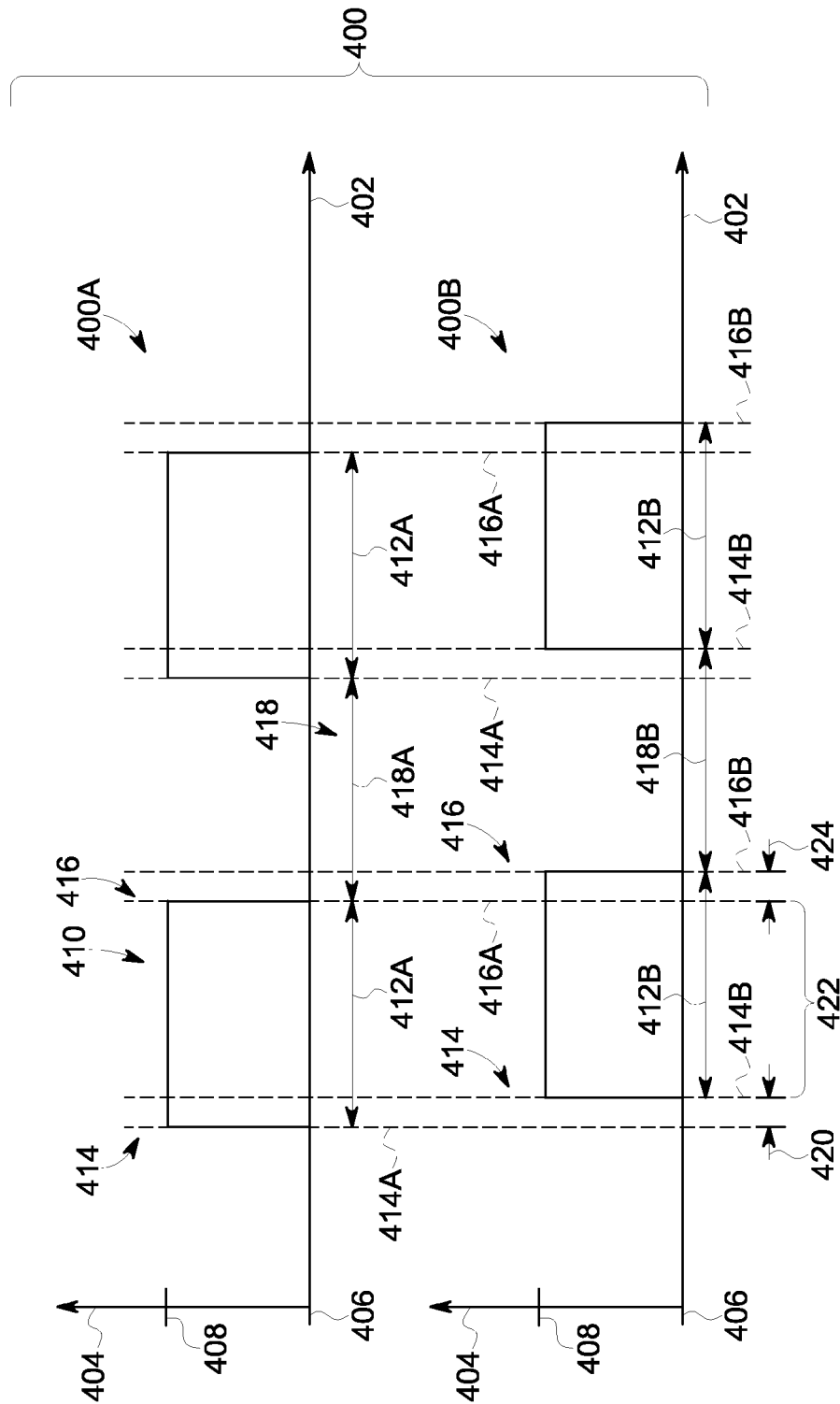
FIG. 4 is a timing diagram of one embodiment of duty cycles of chopper devices shown in FIG. 3.

FIG. 4 is a timing diagram of one embodiment of duty cycles 400 (e.g., duty cycles 400A, 400B) of the chopper devices 316 shown in FIG. 3. The duty cycles 400 are shown alongside horizontal axes 402 representative of time and vertical axes 404 representative of the states (e.g., a blocking state 406 and a conducting state 408) of the chopper devices 316. In one embodiment, the duty cycle 400A represents the different states 406, 408 of the chopper device 316A over time and the duty cycle 400B represents the different states 406, 408 of the chopper device 316B over time. Additional and/or different duty cycles may be used from what is shown in FIG. 4.

The duty cycles 400 alternate between the blocking state 406, when the chopper devices 316 block the conduction of voltage from the traction bus 302 (shown in FIG. 3) to the auxiliary bus 308 (shown in FIG. 3), and the conducting state 408, when the chopper devices 316 conduct voltage from the traction bus 302 to the auxiliary bus 308. The duty cycles 400 include waveforms 410 that represent time periods 412 (e.g., time periods 412A, 412B) during which the chopper devices 316 are in the conducting state 408. The duty cycles 400 may have more waveforms 410 than what is shown in FIG. 4.

The control unit 318 (shown in FIG. 3) controls the duty cycles 400 of the chopper devices 316 by varying one or more of start times 414 (e.g., start times 414A, 414B) of the conducting state time periods 412, end times 416 (e.g., end times 416A, 416B) of the conducting state time periods 412, the temporal lengths of the conducting state time periods 412, and/or temporal lengths of blocking state time periods 418 (e.g., time periods 418A, 418B) that extend between an end time 416 and a subsequent start time 414. The control unit 318 can independently change one or more of the times 414, 416 and/or time periods 412, 418 for one chopper device 316A or 316B without changing the same time or time period of another chopper device 316B or 316A. Alternatively or additionally, the control unit 318 may change one or more of the times 414, 416 and/or time periods 412, 418 of one chopper device 316A or 316B and change the same or different time 414, 416 and/or time period 412, 418 of another chopper device 316B or 316A by a different amount. Changing the times 414, 416 and/or time periods 412, 418 allows for the control unit 318 to temporally offset the duty cycles of the chopper devices 316 from each other such that the duty cycles occur over different time periods.

Returning to the description of the power system 300 shown in FIG. 3 and with continued reference to the duty cycles 400 shown in FIG. 4, controlling the duty cycles 400 of the chopper devices 316 permits the control unit 318 to control how much voltage is conveyed from the traction bus 302 to the auxiliary bus 308. The duty cycles 400 of the different chopper devices 316 can be controlled to occur over different time periods 412 in order to control how long the chopper devices 316 are simultaneously or concurrently conveying voltage from the traction bus 302 to the auxiliary bus 308.

For example, during a first non-overlapping time period 420, the chopper device 316A is in the conducting state 408 but the chopper device 316B is in the blocking state 406. As a result, the chopper device 316A conducts voltage from the positive traction portion 302A of the traction bus 302 to the positive auxiliary portion 308A of the auxiliary bus 308 (e.g., via the transistor device 320 and inductor 324 of the chopper device 316A). But, the chopper device 316B in the blocking state 406 does not conduct voltage from the negative traction portion 302B of the traction bus 302 to the negative auxiliary portion 308B of the auxiliary bus 308.

During a subsequent overlapping time period 422, the chopper devices 316A and 316B are both in the conducting state 408. As a result, the chopper device 316A conducts voltage from the positive traction portion 302A of the fraction bus 302 to the positive auxiliary portion 308A of the auxiliary bus 308 and the chopper device 316B also conducts voltage from the negative traction portion 302B of the traction bus 302 to the negative auxiliary portion 308B of the auxiliary bus 308 (e.g., via the transistor device 320 and the inductor 324 of the chopper device 316B).

During a subsequent, second non-overlapping time period 424, the chopper device 316B is in the conducting state 408 but the chopper device 316A is in the blocking state 406. As a result, the chopper device 316B conducts voltage from the negative traction portion 302B of the traction bus 302 to the negative auxiliary portion 308B of the auxiliary bus 308. But, the chopper device 316A in the blocking state 406 does not conduct voltage from the positive traction portion 302A of the traction bus 302 to the positive auxiliary portion 308A of the auxiliary bus 308.

The duty cycles 400 can be controlled to reduce the voltage transferred from the traction bus 302 to the auxiliary bus 308. For example, by reducing how long multiple chopper devices 316 are simultaneously in the conducting state 408 (e.g., in the overlapping time period 422), the amount of voltage transferred to the auxiliary bus 308 can be reduced. Conversely, by increasing the overlapping time period 422, the amount of voltage that is transferred can be increased.

In one embodiment, the control unit 318 controls the duty cycles 400 of the chopper devices 316 in order to change symmetry of the voltage supplied from the traction bus 302 to the auxiliary bus 308. The symmetry of the voltage may represent the division of voltage between the positive portion 302A, 308A and the negative portion 302B, 308B of the bus 302, 308. In the illustrated embodiment, the symmetry of the voltage on the traction bus 302 may represent the ratio of the voltage on the positive traction portion 302A (e.g., +900 volts) to the voltage on the negative traction portion 302B (e.g., −500 volts). In such an example, the voltage on the traction bus 302 is asymmetric because the absolute value of the voltage on one portion (e.g., 900 volts on the positive traction portion 302A) is greater than the absolute value of the voltage on the other portion (e.g., 500 volts on the negative traction portion 302B). Conversely, the symmetry of the voltage on the auxiliary bus 308 in the illustrated embodiment represents a symmetric division or split of the voltage between the positive and negative auxiliary portions 308A, 308B of the auxiliary bus 308. For example, the voltage on the auxiliary bus 308 may be symmetric because the absolute value of the voltage on one portion (e.g., 350 volts on the positive auxiliary portion 308A) is greater than the absolute value of the voltage on the other portion (e.g., 350 volts on the negative auxiliary portion 308B).

The control unit 318 can control the duty cycles 400 to change the symmetry of the voltage that is transferred to the auxiliary bus 308 by controlling how long the positive voltage on the positive traction portion 302A is transferred to the positive auxiliary portion 308A relative to how long the negative voltage on the negative traction portion 302B is transferred to the negative auxiliary portion 308B over one or more duty cycles 400. For example, if the voltage on the traction bus 302 is asymmetric with respect to the voltage on the positive traction portion 302A (e.g., the absolute value of the voltage on the positive traction portion 302A is greater than the absolute value of the voltage on the negative traction portion 302B), then the control unit 318 can increase the symmetry of the transferred voltage by reducing the non-overlapping time periods 420 of the duty cycles 400 in which the chopper device 316A is transferring voltage from the positive traction portion 302A to the positive auxiliary portion 308A and/or increase the non-overlapping time periods 424 of the duty cycles 400 in which the chopper device 316B is transferring voltage from the negative traction portion 302B to the negative auxiliary portion 308B.

Conversely, if the voltage on the traction bus 302 is asymmetric with respect to the voltage on the negative fraction portion 302B, then the control unit 318 can increase the symmetry of the transferred voltage by reducing the non-overlapping time periods 424 of the duty cycles 400 in which the chopper device 316B is transferring voltage from the negative traction portion 302B to the negative auxiliary portion 308B and/or increase the non-overlapping time periods 420 of the duty cycles 400 in which the chopper device 316A is transferring voltage from the positive traction portion 302A to the positive auxiliary portion 308A.

In the illustrated embodiment, several capacitor devices 330 (e.g., capacitor devices 330A-D) are conductively coupled between the busses 302, 308, 328. For example, a first capacitor device 330A may be conductively coupled with and disposed between the positive traction portion 302A of the traction bus 302 and the positive auxiliary portion 308A of the auxiliary bus 308, a second capacitor device 330B may be conductively coupled with and disposed between the positive auxiliary bus 308A and the center bus 328, a third capacitor device 330C may be conductively coupled with and disposed between the center bus 328 and the negative auxiliary portion 308B of the auxiliary bus 308, and a fourth capacitor device 330D may be conductively coupled with and disposed between the negative auxiliary portion 308B of the auxiliary bus 308 and the negative traction portion 302B of the traction bus 302.

The capacitor devices 330 can at least partially retain or hold voltage from one bus 302, 308, 328 to prevent additional voltage from transferring to another bus 302, 308, 328 and/or to reduce the voltage that is transferred to the other bus 302, 308, 328. For example, when sufficient electric charge has built up in the capacitor devices 330, the capacitor devices 330 can block the conduction of more voltage between the busses 302, 308, 328 to which the capacitor devices 330 are connected. For example, the first capacitor device 330A can block the conduction of voltage from the positive traction portion 302A to the positive auxiliary portion 308A, the second capacitor device 330B can block the conduction of voltage from the positive auxiliary portion 308A to the center bus 328, the third capacitor device 330C can block the conduction of voltage between the center bus 328 and the negative auxiliary portion 308B, and/or the fourth capacitor device 330D can block the conduction of voltage between the negative auxiliary portion 308B and the negative traction portion 302B.

While only two chopper devices 316 are shown in FIG. 3, alternatively, a greater number of chopper devices 316 may be provided. For example, multiple chopper devices 316A may be conductively coupled with the traction bus 302 in parallel so that the current conveyed through the traction bus 302 is divided among the chopper devices 316A before being transferred to the auxiliary bus 308. Similarly, multiple chopper devices 316B may be conductively coupled with the traction bus 302 in parallel. Using multiple chopper devices 316A and/or multiple chopper devices 316B can reduce the amount of current that is controlled by each of the multiple chopper devices 316 (e.g., blocked or conducted through the chopper devices 316). Reducing the amount of voltage that is controlled by each of the chopper devices 316 can allow for less expensive and/or less robust chopper devices 316 to be used in the system 300.

Providing multiple chopper devices 316 also can provide redundancy in case of failure of one or more of the multiple chopper devices 316. For example, in the event that a transistor device 320 of a first chopper device 316A fails, additional chopper devices 316A that are connected in parallel with the first chopper device 316A can continue to operate and to transfer voltage from the traction bus 302 to the auxiliary bus 308.

In the illustrated embodiment, the system 300 includes an auxiliary inverter device 332 that is conductively coupled with the auxiliary bus 308. The auxiliary inverter device 332 can be provided to convert the voltage on the auxiliary bus 308 into an alternating current for powering the non-traction motors 310. The auxiliary inverter device 332 may be a low voltage auxiliary inverter device 332 that is configured to convert low voltages into alternating current, but not high voltages. For example, the auxiliary inverter device 332 may be capable of converting the low voltage on the auxiliary bus 308 into alternating current, but not the high voltage on the fraction bus 302. Using a low voltage auxiliary inverter device 332 can reduce the cost of the system 300 in that such low voltage auxiliary inverter devices 332 may be less expensive than high voltage auxiliary inverter devices 332.

The auxiliary inverter device 332 can generate a multiple phase alternating current (e.g., 3-phase AC) for powering the non-traction motors 310. In one embodiment, each phase of current that is generated by the auxiliary inverter device 332 can be produced from voltage that is provided by a different chopper device 316 or different sets of chopper devices 316A, 316B. For example, a first chopper device 316A (or a first set of chopper devices 316 that includes a first chopper device 316A and a first chopper device 316B) may provide the voltage on the auxiliary bus 308 for a first phase of alternating current generated by the auxiliary inverter device 332. A second chopper device 316A (or a second set of chopper devices 316 that includes a second chopper device 316A and a second chopper device 316B) may provide the voltage on the auxiliary bus 308 for a different, second phase of the alternating current that is generated by the auxiliary inverter device 332. A third chopper device 316A (or a third set of chopper devices 316 that includes a third chopper device 316A and a third chopper device 316B) may provide the voltage on the auxiliary bus 308 for a different, third phase of the alternating current that is generated by the auxiliary inverter device 332.

In the event that one of the chopper devices 316 or sets of chopper devices 316 fails (e.g., is unable to reduce the voltage on the traction bus 302 to a designated voltage for the auxiliary bus 308), then the auxiliary inverter device 332 may continue to operate by producing fewer phases of alternating current. In continuing with the above examples, if the first chopper device 316A or first set of chopper devices 316 fail, then the auxiliary inverter device 332 may continue to generate the alternating current. The alternating current may only include the second and third phases of current that are generated by the second and third chopper devices 316 or sets of chopper devices 316 that continue to operate. As a result, the power output of the non-traction motors 310 may be reduced by a similar amount, such as by one third, due to the decrease in the number of phases of the alternating current. For example, the non-traction motors 310 may continue to operate upon failure of the chopper device 316 or set of chopper devices 316 with the motors 310 operating in a degraded state.

In one embodiment, the control unit 318 may no vary the duty cycles of the chopper devices 316 based on, or in response to, changes in the voltage on the traction bus 302. For example, when the voltage on the fraction bus 302 is no greater than a designated threshold (e.g., 700 volts in the illustrated example), the control unit 318 may leave the chopper devices 316 in a conducting state so that the voltage on the traction bus 302 conducts through the chopper devices 316 to the auxiliary bus 308 without being reduced (e.g., using the different duty cycles of the chopper devices 316). When the voltage on the traction bus 302 increases above the threshold, however, the control unit 318 may independently control the duty cycles of the chopper devices 316 to reduce the voltage to a designated amount or the designated threshold, as described above.

In one embodiment, a charging bus 334 may be connected between the center bus 328 and the charger device 312. The charging bus 334 may deliver voltage from the center bus 328 to the charger device 312 in order to charge one or more inductors, capacitors, fuel cells, and the like, for later use in powering one or more of the non-traction motors 310. As shown in FIG. 3, the charger device 312 may include an H-bridge circuit that includes two transistor devices 336 (e.g., insulated gate bipolar junction transistors) on opposite sides of a transformer device 338. When the charger device 312 is activated (e.g., switched ON), the transistor devices 336 on opposite sides of the transformer device 338 may switch between blocking and conducting states at a relatively fast rate (e.g., 60 hertz or faster). This switching of the transistor devices 336 may cause the electric energy (e.g., charge or voltage) on opposite sides of the transformer device 338 to remain at or near a constant value. For example, the opposite sides (e.g., the inductors) of the transformer device 338 may not have sufficient time to dissipate the electric energy that is built up by the transistor devices 336 being in the conducting state. As a result, over a relatively short time period, the charge on both sides of the transformer device 338 may be approximately equal or constant. This charge can then be applied to an energy storage device, such as a battery onboard the vehicle 102 to charge the device.

Figure 5:
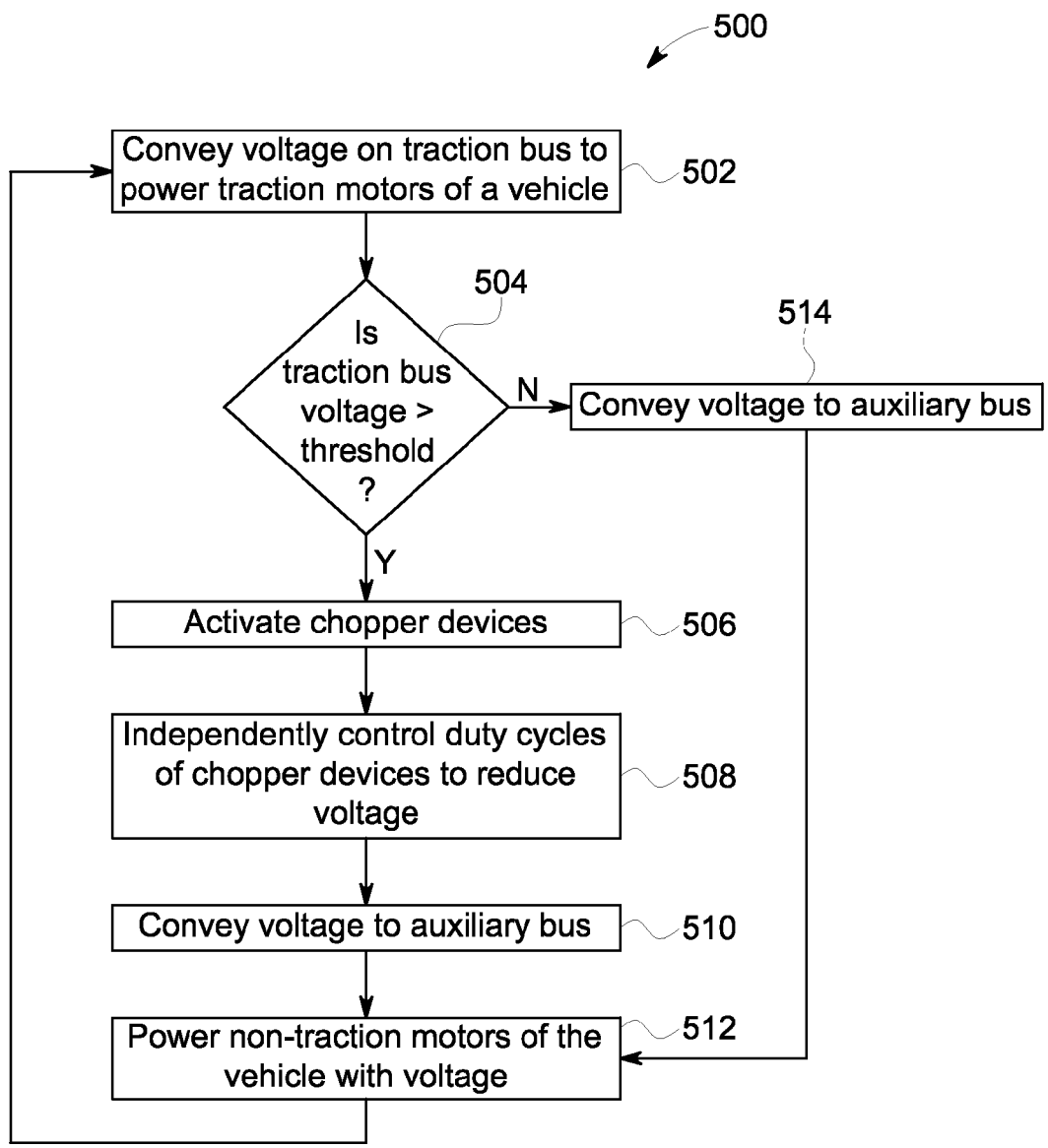
FIG. 5 is a flowchart of one embodiment of a method for powering traction motors and non-traction motors of a vehicle.

FIG. 5 is a flowchart of one embodiment of a method 500 for powering traction motors and non-traction motors of a vehicle. The method 500 may be used in conjunction with one or more embodiments of the power system 300 (shown in FIG. 3) and/or the vehicle 102 (shown in FIG. 1) described above.

At 502, voltage is conveyed on a fraction bus of the vehicle to power one or more traction motors of the vehicle in order to propel the vehicle. For example, voltage from a power source, such as the alternator 124 (shown in FIG. 1), a battery, and the like, may be transmitted along the traction bus 116, 302 (shown in FIGS. 1 and 3) to power the traction motors 112, 304 (shown in FIGS. 1 and 3).

At 504, the voltage that is conveyed along the traction bus is examined to determine if the voltage exceeds a designated threshold. For example, if the voltage is too great (e.g., a high voltage) and cannot be used by the non-traction motors of the vehicle, then the voltage may need to be reduced to a smaller voltage (e.g., a low voltage) prior to supplying the voltage to the non-traction motors. As a result, flow of the method 500 may proceed to 506. On the other hand, if the voltage does not exceed the threshold, then the voltage may be able to be supplied to the non-traction motors without reducing the voltage. In such a scenario, flow of the method 400 can proceed to 514.

At 514, the voltage that does not exceed the threshold is conveyed to an auxiliary bus of the vehicle for supplying the voltage to non-traction motors of the vehicle. For example, the chopper devices 316 (shown in FIG. 3) may be turned to a conductive state without varying or independently controlling the duty cycles of the chopper devices 316. The voltage on the traction bus 116, 302 conducts through the chopper devices 316 and to the auxiliary bus 118,308 (shown in FIGS. 1 and 3) to power the non-traction motors 114, 310.

At 506, the chopper devices are activated to reduce the voltage that does exceed the threshold to a smaller voltage. For example, the control unit 318 (shown in FIG. 3) can begin controlling the duty cycles 400 (shown in FIG. 4) of the chopper devices 316 to control when the chopper devices 316 convey the voltage on the traction bus 302 to the auxiliary bus 308.

At 508, the duty cycles of the chopper devices are independently controlled. For example, the control unit 318 may change start times, end times, and/or the time periods of each duty cycle during which the chopper devices 316 are conducting voltage from the traction bus 302 to the auxiliary bus 308. As described above, the duty cycles of the multiple chopper devices 316 may be different so that less than the entire voltage on the fraction bus 302 may be conveyed to the auxiliary bus 308 at one or more time periods.

At 510, the voltage is conveyed through the chopper devices to the auxiliary bus. As described above, the independent control of the duty cycles of the chopper devices 316 can reduce the voltage from a high voltage on the traction bus 302 to a low voltage on the auxiliary bus 308.

At 512, the non-traction motors connected to the auxiliary bus are powered by the voltage. For example, the non-traction motors 114, 310 connected to the auxiliary bus 118, 308 are powered by the voltage that is reduced by the independently controlled chopper devices 316 to a level that can be used by the non-traction motors 114, 310 and/or without conveying the voltage through a transformer or filter.

Flow of the method 500 can return to 502, where voltage continues to be conveyed along the traction bus. The method 500 can proceed in a loop-wise manner to repeatedly monitor the voltage on the traction bus, determine whether to use the chopper devices to reduce the voltage (e.g., at 504), and, if the voltage is to be reduced, to independently control the duty cycles of the chopper devices to reduce the voltage for the non-traction motors on the auxiliary bus.

In another embodiment, a system (e.g., for powering a vehicle) includes a traction bus, an auxiliary bus, first and second chopper devices, and a control unit. The fraction bus is conductively coupled with one or more traction motors of a vehicle. The traction bus is configured to supply a first voltage to power the one or more traction motors in order to propel the vehicle. The auxiliary bus is conductively coupled with one or more non-traction motors of the vehicle and is configured to supply a different, second voltage to power the one or more non-traction motors to perform non-tractive work of the vehicle. The first and second chopper devices are conductively coupled with both the traction bus and the auxiliary bus. The first and second chopper devices are configured to control conduction of the first voltage on the traction bus to the auxiliary bus as the second voltage using first and second duty cycles, respectively. The control unit is operatively coupled with the first and second chopper devices to control the first and second duty cycles of the first and second chopper devices, respectively, such that the first voltage on the traction bus is changed to the second voltage on the auxiliary bus.

In another aspect, the second voltage on the auxiliary bus is lower than the first voltage on the traction bus and the control unit is configured to control the first and second duty cycles of the first and second chopper devices such that the first voltage on the traction bus is reduced to the second voltage on the auxiliary bus.

In another aspect, the control unit is configured to independently control the first and second duty cycles of the first and second chopper devices, respectively, such that the first and second duty cycles occur over different time periods.

In another aspect, the traction bus includes a positive traction portion configured to convey a positive component of the first voltage and a negative traction portion configured to convey a negative component of the first voltage on the traction bus to the one or more traction motors. The auxiliary bus can include a positive auxiliary portion configured to convey a positive component of the second voltage and a negative auxiliary portion configured to convey a negative component of the second voltage to the non-traction motors.

In another aspect, the first chopper device is conductively coupled with the positive traction portion of the traction bus and with the positive auxiliary portion of the auxiliary bus such that the first chopper device is controllable by the control unit to transfer the positive component of the first voltage on the traction bus to the auxiliary bus as the positive component of the second voltage.

In another aspect, the second chopper device is conductively coupled with the negative traction portion of the fraction bus and with the negative auxiliary portion of the auxiliary bus such that the second chopper device is controllable by the control unit to transfer the negative component of the first voltage on the traction bus to the auxiliary bus as the negative component of the second voltage.

In another aspect, the control unit is configured to control the first and second duty cycles of the first and second chopper devices, respectively, such that the positive component and the negative component of the first voltage on the traction bus are asymmetric with respect to each other and the positive component and the negative component of the second voltage on the auxiliary bus are symmetric with respect to each other. For example, the positive component and the negative component of the first and second voltages may be asymmetric or symmetric with respect to a designated voltage (e.g., zero volts).

In another aspect, each of the first and second chopper devices includes a respective input terminal, respective first and second output terminals, a respective transistor device, and a respective diode device. The transistor device can be conductively coupled with the diode device, the input terminal joined with the transistor device, the first output terminal joined with both the transistor device and the diode device and electrically disposed between the transistor device and the diode device, and the second output terminal joined with the diode device.

In another aspect, the input terminal of the first chopper device is conductively coupled with the positive traction portion of the traction bus, the first output terminal of the first chopper device is conductively coupled with the positive auxiliary portion of the auxiliary bus, and the second output terminal of the first chopper device is conductively coupled with the input terminal of the first chopper device.

In another aspect, the system also includes first and second capacitor devices. The first capacitor device is conductively coupled between the positive traction portion of the traction bus and the positive auxiliary portion of the auxiliary bus. The second capacitor device is conductively coupled between the negative fraction portion of the traction bus and the negative auxiliary portion of the auxiliary bus. The first and second capacitor devices are configured to retain at least some energy of the positive and negative components of the first voltage, respectively, between the duty cycles of the first and second chopper devices.

In another aspect, the traction bus is configured to convey the first voltage as a first voltage level of at least 1400 volts to the one or more traction motors and the control unit is configured to control the first and second duty cycles of the first and second choppers, respectively, to reduce the first voltage to a second voltage level of 700 volts or less as the second voltage on the auxiliary bus for powering the one or more non-traction motors.

In another aspect, the one or more non-traction motors are motors that operate at voltages of 480 volts or less, and the one or more non-traction motors are not interconnected with the auxiliary bus through one or more filters, capacitors, or transformers.

In another embodiment, another system (e.g., for powering a vehicle) includes a traction bus, an auxiliary bus, first and second chopper devices, and a control unit. The traction bus is conductively coupled with one or more traction motors of a vehicle and is configured to supply a first voltage to power the one or more traction motors in order to propel the vehicle. The auxiliary bus is conductively coupled with one or more non-traction motors of the vehicle and is configured to supply a different, second voltage to power the one or more non-traction motors to perform non-tractive work of the vehicle. The first and second chopper devices are conductively coupled with both the traction bus and the auxiliary bus and are configured to control conduction of the first voltage on the traction bus to the auxiliary bus as the second voltage using first and second duty cycles, respectively. The control unit is operatively coupled with the first and second chopper devices to independently control the first and second duty cycles of the first and second chopper devices, respectively, such that the first and second duty cycles occur over different time periods in order to change the first voltage on the traction bus to the second voltage on the auxiliary bus.

In another aspect, the second voltage on the auxiliary bus is lower than the first voltage on the traction bus and the control unit is configured to control the first and second duty cycles of the first and second chopper devices such that the first voltage on the traction bus is reduced to the second voltage on the auxiliary bus.

In another aspect, the traction bus includes a positive traction portion configured to convey a positive component of the first voltage and a negative traction portion configured to convey a negative component of the first voltage on the traction bus to the one or more traction motors. The auxiliary bus can include a positive auxiliary portion configured to convey a positive component of the second voltage and a negative auxiliary portion configured to convey a negative component of the second voltage to the non-traction motors.

In another aspect, the first chopper device is conductively coupled with the positive traction portion of the traction bus and with the positive auxiliary portion of the auxiliary bus such that the first chopper device is controllable by the control unit to transfer the positive component of the first voltage on the traction bus to the auxiliary bus as the positive component of the second voltage.

In another aspect, the second chopper device is conductively coupled with the negative traction portion of the fraction bus and with the negative auxiliary portion of the auxiliary bus such that the second chopper device is controllable by the control unit to transfer the negative component of the first voltage on the traction bus to the auxiliary bus as the negative component of the second voltage.

In another aspect, the traction bus is configured to convey the first voltage as a first voltage level of at least 1400 volts to the one or more traction motors and the control unit is configured to control the first and second duty cycles of the first and second choppers, respectively, to reduce the first voltage to a second voltage level of 700 volts or less as the second voltage on the auxiliary bus for powering the one or more non-traction motors.

In another aspect, the one or more non-traction motors are motors that operate at voltages of 480 volts or less, and the one or more non-traction motors are not interconnected with the auxiliary bus through one or more filters, capacitors, or transformers.

In another embodiment, a method (e.g., for powering a vehicle) includes conveying a first voltage along a traction bus of a vehicle that is conductively coupled with one or more traction motors of the vehicle. The first voltage powers the one or more traction motors in order to propel the vehicle. The method also includes controlling first and second chopper devices that are conductively coupled with the traction bus and an auxiliary bus of the vehicle over different first and second duty cycles, respectively, such that the first and second chopper devices convert the first voltage to a second voltage on the auxiliary bus. The method further includes conveying the second voltage along the auxiliary bus to one or more non-traction motors of the vehicle in order to power the one or more non-traction motors to perform non-tractive work of the vehicle. The first and second duty cycles of the first and second chopper devices differ from each other such that the first voltage is reduced to the second voltage to power the non-traction motors without conveying the first voltage that is received by the first and second choppers through one or more of a filter or transformer to reduce the first voltage or a transient voltage of the first voltage prior to the second voltage being received by the non-traction motors.

In another aspect, controlling the first and second chopper devices includes temporally offsetting the first and second duty cycles of the first and second chopper devices, respectively, such that the first and second duty cycles occur over different time periods.

In another aspect, conveying the first voltage includes conveying a positive component of the first voltage along a positive traction portion of the traction bus to the one or more traction motors and separately conveying a negative component of the first voltage along a negative traction portion of the traction bus that is separate from the positive traction portion. Conveying the second voltage can include conveying a positive component of the second voltage along a positive auxiliary portion of the auxiliary bus to the one or more non-traction motors and conveying a negative auxiliary portion of the auxiliary bus that is separate from the positive auxiliary portion.

In another aspect, controlling the first and second chopper devices includes controlling the first chopper device to convert the positive component of the first voltage on the traction bus to the positive component of the second voltage on the auxiliary bus and controlling the second chopper device to convert the negative component of the first voltage on the traction bus to the negative component of the second voltage on the auxiliary bus.

In another aspect, controlling the first and second chopper devices includes alternating commencement or termination of the first and second duty cycles of the first and second chopper devices, respectively, such that the positive component and the negative component of the first voltage on the traction bus are asymmetric about a designated voltage level and the positive component and the negative component of the second voltage on the auxiliary bus are symmetric about the designated voltage level.

In another aspect, the method also includes retaining at least a portion of energy of the first voltage in one or more capacitor devices conductively coupled with the first and second chopper devices during an overlapping time period between the first and second duty cycles of the first and second chopper devices, respectively.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
a traction bus conductively coupled with one or more traction motors of a vehicle, the traction bus including a positive traction portion and a negative traction portion configured to supply corresponding positive and negative components of a first voltage to power the one or more traction motors in order to propel the vehicle;
an auxiliary bus conductively coupled with one or more non-traction motors of the vehicle, the auxiliary bus including a positive auxiliary portion and a negative auxiliary portion configured to supply corresponding positive and negative components of a different, second voltage to power the one or more non-traction motors to perform non-tractive work of the vehicle;
first and second chopper devices each including input terminals and first output terminals, the input terminal of the first chopper device conductively coupled with the positive traction portion of the traction bus, the first output terminal of the first chopper device conductively coupled with the positive auxiliary portion of the auxiliary bus, the input terminal of the second chopper device conductively coupled with the negative traction portion of the traction bus, the first output terminal of the second chopper device conductively coupled with the negative auxiliary portion of the auxiliary bus, the first and second chopper devices configured to control conduction of the first voltage on the positive and negative traction portions of the traction bus to the positive and negative auxiliary portions of the auxiliary bus as the second voltage using first and second duty cycles, respectively; and
a control unit operatively coupled with the first and second chopper devices to change the positive and negative components of the first voltage on the traction bus to the positive and negative components of the second voltage on the auxiliary bus by controlling the first and second duty cycles of the first and second chopper devices.

2. The system of claim 1, wherein the second voltage on the auxiliary bus is lower than the first voltage on the traction bus and the control unit is configured to control the first and second duty cycles of the first and second chopper devices such that the first voltage on the traction bus is reduced to the second voltage on the auxiliary bus.

3. The system of claim 1, wherein the control unit is configured to independently control the first and second duty cycles of the first and second chopper devices, respectively, such that the first and second duty cycles occur over different time periods.

4. The system of claim 1, wherein the first chopper device is controllable by the control unit to transfer the positive component of the first voltage on the traction bus to the auxiliary bus as the positive component of the second voltage.

5. The system of claim 1, wherein the second chopper device is controllable by the control unit to transfer the negative component of the first voltage on the traction bus to the auxiliary bus as the negative component of the second voltage.

6. The system of claim 1, wherein the control unit is configured to control the first and second duty cycles of the first and second chopper devices, respectively, such that the positive component and the negative component of the first voltage on the traction bus are asymmetric with respect to each other and the positive component and the negative component of the second voltage on the auxiliary bus are symmetric with respect to each other.

7. The system of claim 1, wherein each of the first and second chopper devices also includes a respective second output terminal, a respective transistor device, and a respective diode device, the transistor device conductively coupled with the diode device, the input terminal joined with the transistor device, the first output terminal joined with both the transistor device and the diode device and electrically disposed between the transistor device and the diode device, and the second output terminal joined with the diode device.

8. The system of claim 7, wherein the second output terminal of the first chopper device is conductively coupled with the second output terminal of the second chopper device.

9. The system of claim 1, further comprising a first capacitor device conductively coupled between the positive traction portion of the traction bus and the positive auxiliary portion of the auxiliary bus and a second capacitor device conductively coupled between the negative traction portion of the traction bus and the negative auxiliary portion of the auxiliary bus, the first and second capacitor devices configured to retain at least some energy of the positive and negative components of the first voltage, respectively, between the duty cycles of the first and second chopper devices.

10. The system of claim 1, wherein the traction bus is configured to convey the first voltage as a first voltage level of at least 1400 volts to the one or more traction motors and the control unit is configured to control the first and second duty cycles of the first and second choppers, respectively, to reduce the first voltage to a second voltage level of 700volts or less as the second voltage on the auxiliary bus for powering the one or more non-traction motors.

11. The system of claim 10, wherein the one or more non-traction motors are motors that operate at voltages of 480 volts or less, and the one or more non-traction motors are not interconnected with the auxiliary bus through one or more filters, capacitors, or transformers.

12. A system comprising:
a traction bus conductively coupled with one or more traction motors of a vehicle, the traction bus configured to supply a first voltage to power the one or more traction motors in order to propel the vehicle;
an auxiliary bus conductively coupled with one or more non-traction motors of the vehicle, the auxiliary bus configured to supply a different, second voltage to power the one or more non-traction motors to perform non-tractive work of the vehicle;
first and second chopper devices conductively coupled with both the traction bus and the auxiliary bus, the first and second chopper devices configured to control conduction of the first voltage on the traction bus to the auxiliary bus as the second voltage using first and second duty cycles, respectively; and
a control unit operatively coupled with the first and second chopper devices to independently control the first and second duty cycles of the first and second chopper devices, respectively, such that the first and second duty cycles occur over different time periods in order to change the first voltage on the traction bus to the second voltage on the auxiliary bus.

13. The system of claim 12, wherein the second voltage on the auxiliary bus is lower than the first voltage on the traction bus and the control unit is configured to control the first and second duty cycles of the first and second chopper devices such that the first voltage on the traction bus is reduced to the second voltage on the auxiliary bus.

14. The system of claim 12, wherein the traction bus includes a positive traction portion configured to convey a positive component of the first voltage and a negative traction portion configured to convey a negative component of the first voltage on the traction bus to the one or more traction motors, and the auxiliary bus includes a positive auxiliary portion configured to convey a positive component of the second voltage and a negative auxiliary portion configured to convey a negative component of the second voltage to the non-traction motors.

15. The system of claim 14, wherein the first chopper device is conductively coupled with the positive traction portion of the traction bus and with the positive auxiliary portion of the auxiliary bus such that the first chopper device is controllable by the control unit to transfer the positive component of the first voltage on the traction bus to the auxiliary bus as the positive component of the second voltage.

16. The system of claim 14, wherein the second chopper device is conductively coupled with the negative traction portion of the traction bus and with the negative auxiliary portion of the auxiliary bus such that the second chopper device is controllable by the control unit to transfer the negative component of the first voltage on the traction bus to the auxiliary bus as the negative component of the second voltage.

17. The system of claim 12, wherein the traction bus is configured to convey the first voltage as a first voltage level of at least 1400 volts to the one or more traction motors and the control unit is configured to control the first and second duty cycles of the first and second choppers, respectively, to reduce the first voltage to a second voltage level of 700 volts or less as the second voltage on the auxiliary bus for powering the one or more non-traction motors.

18. The system of claim 17, wherein the one or more non-traction motors are motors that operate at voltages of 480 volts or less, and the one or more non-traction motors are not interconnected with the auxiliary bus through one or more filters, capacitors, or transformers.

19. A method comprising:
conveying a first voltage along a traction bus of a vehicle that is conductively coupled with one or more traction motors of the vehicle, the first voltage powering the one or more traction motors in order to propel the vehicle;
controlling first and second chopper devices that are conductively coupled with the traction bus and an auxiliary bus of the vehicle, the first and second chopper devices controlled over different first and second duty cycles, respectively, such that the first and second chopper devices convert the first voltage to a second voltage on the auxiliary bus; and
conveying the second voltage along the auxiliary bus to one or more non-traction motors of the vehicle in order to power the one or more non-traction motors to perform non-tractive work of the vehicle,
wherein the first and second duty cycles of the first and second chopper devices differ from each other such that the first voltage is reduced to the second voltage to power the non-traction motors without conveying the first voltage that is received by the first and second choppers through one or more of a filter or transformer to reduce the first voltage or a transient voltage of the first voltage prior to the second voltage being received by the non-traction motors.

20. The method of claim 19, wherein controlling the first and second chopper devices includes temporally offsetting the first and second duty cycles of the first and second chopper devices, respectively, such that the first and second duty cycles occur over different time periods.

21. The method of claim 19, wherein conveying the first voltage includes conveying a positive component of the first voltage along a positive traction portion of the fraction bus to the one or more traction motors and separately conveying a negative component of the first voltage along a negative traction portion of the traction bus that is separate from the positive traction portion, and conveying the second voltage includes conveying a positive component of the second voltage along a positive auxiliary portion of the auxiliary bus to the one or more non-traction motors and conveying a negative auxiliary portion of the auxiliary bus that is separate from the positive auxiliary portion.

22. The method of claim 21, wherein controlling the first and second chopper devices includes controlling the first chopper device to convert the positive component of the first voltage on the traction bus to the positive component of the second voltage on the auxiliary bus and controlling the second chopper device to convert the negative component of the first voltage on the traction bus to the negative component of the second voltage on the auxiliary bus.

23. The method of claim 21, wherein controlling the first and second chopper devices includes alternating commencement or termination of the first and second duty cycles of the first and second chopper devices, respectively, such that the positive component and the negative component of the first voltage on the traction bus are asymmetric about a designated voltage level and the positive component and the negative component of the second voltage on the auxiliary bus are symmetric about the designated voltage level.

24. The method of claim 19, further comprising retaining at least a portion of energy of the first voltage in one or more capacitor devices conductively coupled with the first and second chopper devices during an overlapping time period between the first and second duty cycles of the first and second chopper devices, respectively.

* * * * *